United States Patent [19]

Stout

[11] Patent Number: 5,423,952
[45] Date of Patent: Jun. 13, 1995

[54] STRUCTURE FOR MULTIPLE-EFFECT DISTILLATION

[75] Inventor: Timothy R. Stout, Cameron Park, Calif.

[73] Assignee: T & G Technologies, Inc., Lodi, Calif.

[21] Appl. No.: 918,569

[22] Filed: Jul. 22, 1992

[51] Int. Cl.[6] .............................................. B01D 1/26
[52] U.S. Cl. .................... 202/174; 159/13.2; 159/27.1; 159/43.1; 159/DIG. 8; 159/DIG. 42; 159/49; 202/236
[58] Field of Search .............. 202/174, 197, 269, 202, 202/236, 237; 159/43.1, 13.2, 13.3, 27.1, DIG. 8, 27.3, 18, 49, DIG. 42; 203/89; 165/115; 222/563

[56] References Cited

U.S. PATENT DOCUMENTS

| | | | |
|---|---|---|---|
| 881,523 | 3/1908 | Winter | 159/27.3 |
| 896,460 | 8/1908 | Prache et al. | 159/27.3 |
| 984,754 | 2/1911 | Eijdman | 159/27.3 |
| 1,028,738 | 6/1912 | Kestner | 159/27.3 |
| 1,265,863 | 5/1918 | Abbott, Jr. | 159/27.1 |
| 2,165,044 | 7/1939 | Fox et al. | 202/174 |
| 3,266,566 | 8/1966 | Huet | 159/27.3 |
| 3,303,106 | 2/1967 | Standiford, Jr. | 202/174 |
| 3,768,539 | 10/1973 | Chamberlin et al. | 202/174 |
| 3,797,552 | 3/1974 | Frank et al. | 202/174 |
| 3,824,154 | 7/1974 | Takada et al. | 159/DIG. 8 |
| 3,849,259 | 11/1974 | Steinbruchel | 202/174 |
| 3,875,988 | 4/1975 | Machida et al. | 202/174 |
| 3,941,663 | 3/1976 | Steinbruchel | 202/174 |
| 4,004,964 | 1/1977 | Ducasse | 159/27.3 |
| 4,925,526 | 5/1990 | Havukainen | 159/13.3 |
| 4,932,468 | 6/1990 | Ayub | 165/115 |

FOREIGN PATENT DOCUMENTS

| | | | |
|---|---|---|---|
| 2219650 | 12/1972 | Germany | 202/174 |
| 2415294 | 10/1975 | Germany | 202/174 |
| 7109441 | 3/1971 | Japan | 202/174 |

Primary Examiner—Virginia Manoharan
Attorney, Agent, or Firm—Popham, Haik, Schnobrich & Kaufman, Ltd.

[57] ABSTRACT

A concatenable module for a multiple-effect still has a chamber encompassed by four walls and two baffles, where one baffle is shared with the preceeding effect and the other the subsequent effect. Heat exchanger tubes mount into an accumulator which is sealed to a baffle, an aperature in the baffle at the accumulator allows vapors and fluids to flow between modules.

A distribution plug seals the top end of a heat exchanger tube while carrying distilland through internal channels until it reaches a ring channel which carries distilland in evenly around the plug. A gap below the ring channel between the plug and tube allow distilland to flow evenly on the tube as it leaves the plug.

4 Claims, 4 Drawing Sheets

STRUCTURE FOR MULTIPLE-EFFECT DISTILLATION

This invention relates to an improved structure for multiple-effect distillation. More specifically, it relates to a rectangular, modular structure for each effect, wherein a multiplicity of modules are concatenated to produce the desired number of effects.

BACKGROUND AND SUMMARY OF THE INVENTION

Multiple-effect distillation is a well-established process for purifying liquids. It is particularly useful for sea-water distillation, although it can be effectively used with other chemicals, such as alcohols.

Most multiple-effect stills are made using a multiplicity of cylindrical chambers, with a separate chamber for each effect and an elaborate tubing mechanism being used to connect the effects. We disclose a rectangular configuration with a modular design which allows easy access for maintenance, is simple to construct, and has a short, efficient path for the vapor to follow as it moves from one effect to the next.

The prior art which most nearly resembles our invention is Takada et al in their U.S. Pat. No. 3,824,154. Takada provides for a bundle of horizontally oriented heat exchanger tubes in each effect. The effects are separated in part by a partition wall, which also contains a vapor passageway, and in part by the bottom surface of a preheating chamber. Takada requires his partitions to be substantially horizontal.

Takada's invention cannot be used as shown with vertical tubes. Furthermore, his invention requires a multiplicity of jet holes to be installed in his partition wall to allow distilland to flow between the effects. Furthermore, his preheating chamber must run the entire length of the tubes. This results in the vapor path being longer and more convoluted in his invention than ours, and thus subjects the vapor to greater pressure losses as it travels between effects, decreasing the energy efficiency of his distillation process as compared to ours.

My invention provides for vertical tubes with simply constructed, vertically oriented baffles separating the effects.

DESCRIPTION OF THE PREFERRED EMBODIMENTS

Figure 1:
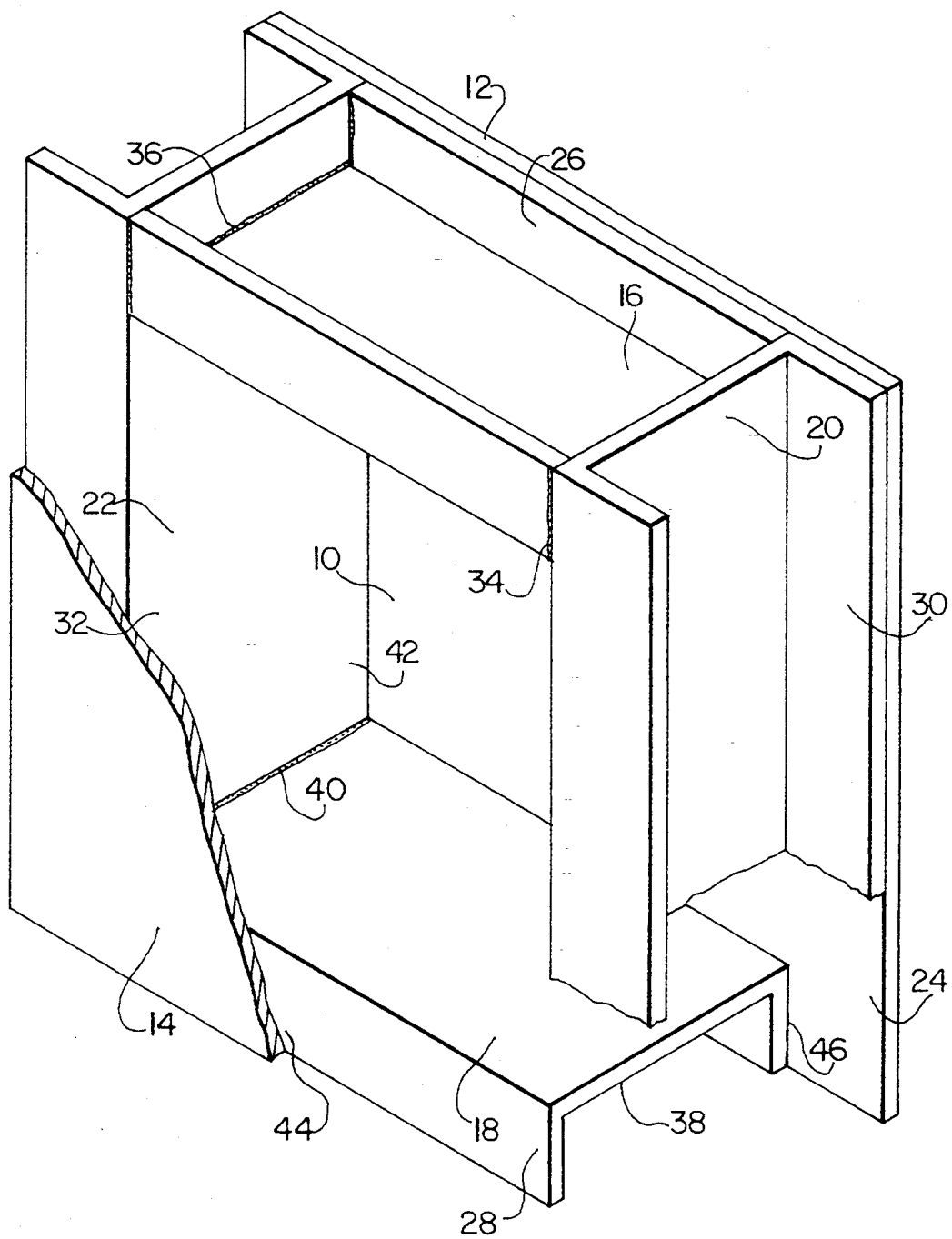
FIG. 1 is an orthogonal view with cutaway of a basic structure used in both the first and second embodiments.

In FIG. 1 a vapor-tight chamber 10 for an effect module 12 is enclosed by a first baffle 14, an upper wall 16, a lower wall 18, a first side wall 20, a second side wall 22, and a second baffle 24. Upper wall 16 comprises the web portion of first channel 26. Lower wall 18 comprises the web portion of second channel 28. First side wall 20 comprises that portion of the web of third channel 30 which lies at and below the junction of upper wall 16 with third channel 30 and at and above the junction of lower wall 18 with third channel 30, Second side wall 22 comprises that portion of the web of fourth channel 32 which lies at and below the junction of upper wall 16 with fourth channel 32 and at and above the junction of lower wall 18 with fourth channel 32.

A portion of third channel 30 has been cut away in the illustration to clarify the orientation of second channel 28.

The flange portions of channels 26, 28, 30, and 32 are used for fastening purposes. First channel 26 is welded to third channel 30 at first weld 34, which starts at an extremity of one of the flanges of first channel 26, continues to and across the flange, and then to the extermity of the second flange. Similarly second weld 36 fastens first channel 26 to third channel 30, third weld 38 fastens second channel 28 to third channel 30, and fourth weld 40 fastens second channel 28 to fourth channel 32.

Conceptually, the four pieces of welded channel constitute a containment box 42. First baffle 14 extends past all four of said walls 16, 18, 20, and 22 and covers the flanges of a first end 44 of box 42 in order to allow the first baffle 14 to be fastened to box 42. Second baffle 24 likewise covers the flanges of a second end 46 of box 42 in order that it too may be fastened to box 42.

both of the embodiments featured in this specification are based upon the structure of FIG. 1, modified where appropriate.

In order to aid in understanding the same reference numbers will be used in the various figures to follow when similar structures are discussed.

Figure 2:
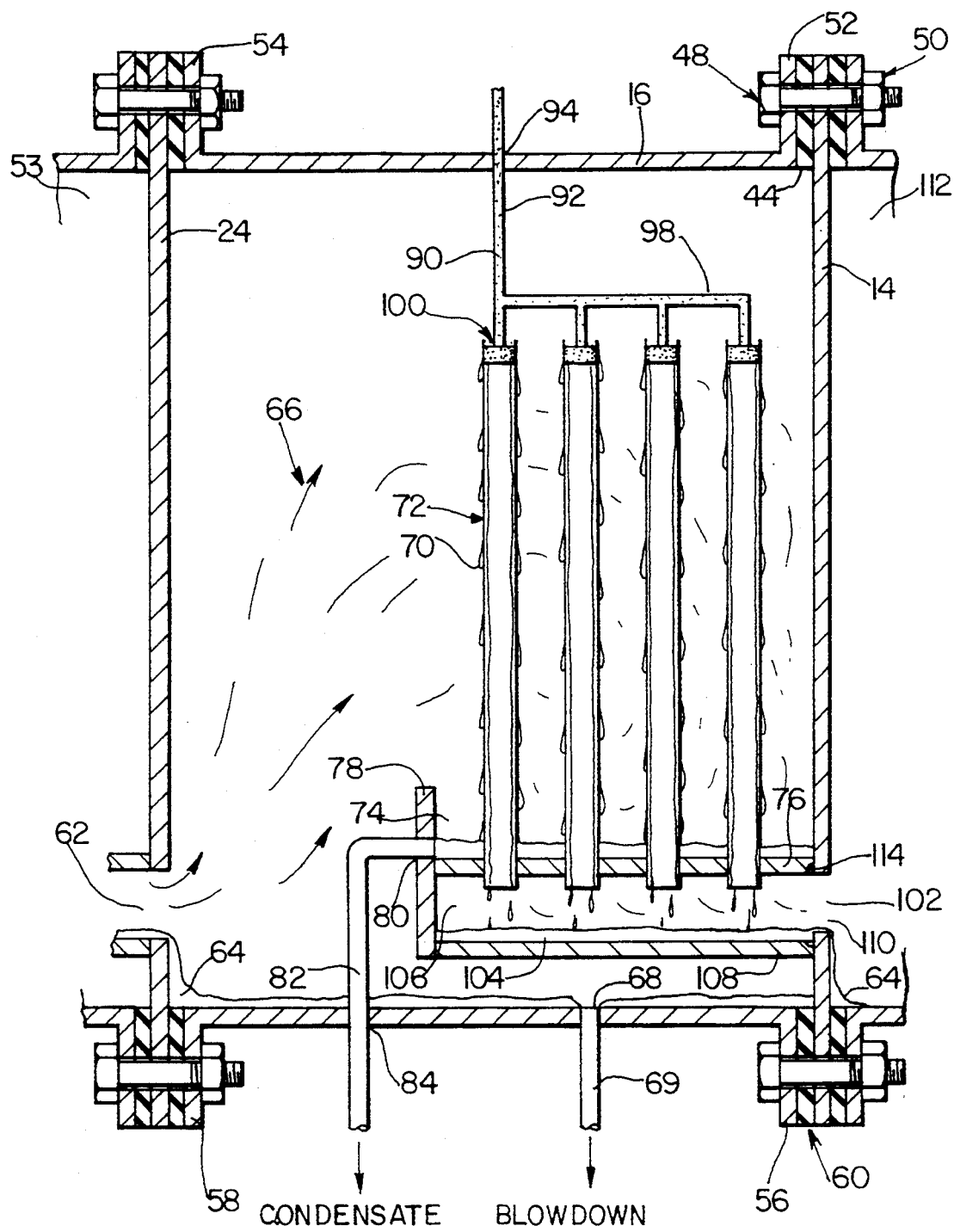
FIG. 2 is a diagram of a longitudinal sectional view of one embodiment of the invention.

In FIG. 2 the first baffle 14 is fastened along its inside surface by one of the bolts 48 with one of the nuts 50 to upper wall 16 by means of a first flange 52 which is a perpendicular extension of upper wall 16 at first end 44. Similarly, second baffle 24 is fastened along what will be considered its outer surface, thus making its inner surface that surface which faces the adjacent effect 53, which is partially illustrated, to upper wall 16 by means of a second flange 54, which is likewise an extension of upper wall 16 at its second end 46. A third flange 56 and fourth flange 58, which are extensions of lower wall 18, are similarly used to connect baffles 14 and 24 to lower wall 18. Gaskets 60 are inserted between the baffles 14 and 24 and the flanges 48, 54, 56, and 58 in order to effect a vapor-tight seal.

Aperture 62 is provided in second baffle 24 to allow the flow of blowdown distilland 64 and evaporate 66 across the second baffle 24 from the adjacent, leftward effect 53. Blowdown exhaust port 68 and blowdown tube 69 are provided in lower wall 18 to allow the removal from the effect module 12 of blowdown distilland 64 as well as any condensate forming on the side walls 20 and 22 (not illustrated in this figure but understood from the discussion for FIG. 1) which has flowed to the bottom of chamber 10.

Evaporate 66 will flow through chamber 10 until it condenses as condensate 70 on the outer edges of heat exchanger tubes 72, from which it flows into upper accumulator 74. A tube sheet 76 supports heat exchanger tubes 72 which are inserted within it. Upper accumulator 74 is bounded on the bottom by tube sheet 76, on one side by the inside surface of first baffle 14, and by sides 78, of which the side opposing said first baffle 14 is shown; upper accumulator 74 opens at the top into chamber 10. An upper accumulator port 80 is provided within side 78 to allow condensate 70 to flow down condensate tube 82, through condensate exhaust port 84 within lower wall 18, and out of the module 12.

Supply distilland 90 is conveyed by a distilland tube 92 through a distilland port 94 in upper wall 16 to distilland manifold 98 and then to each of the distribution plugs 100 found inserted at the upper end of each of the heat exchanger tubes 72. (FIG. 5 will give an expanded view of distribution plug 100). Distribution plugs 100 provide a vapor tight seal between the interior of heat exchanger tubes 72 and chamber 10 and also apply distilland 90 as a film 101 to the interior walls of each of the heat exchanger tubes 72.

As distilland 90 flows down the interior walls of heat exchanger tubes 72 it partially evaporates; evaporate 102 and blowdown distilland 104 flow out of the bottom of heat exchanger tubes 72 into a lower accumulator 106. Lower accumulator 106 is bounded at the top by tube sheet 76, on the bottom by plate 108, around three of the edges by sides 78, and on the fourth edge by the inside surface of first baffle 14. An aperture 110 is placed in first baffle 14 within that portion of the baffle which is part of lower accumulator 106; evaporate 102 and blowdown distilland 104 pass out of lower accumulator 106, through aperture 110, and into the next adjecent rightward effect 112. Notice that as an evaporate 102 and blowdown distilland 104 pass through aperture 100 of first baffle 14 of one effect, they become the evaporate 66 and blowdown distilland 64 passing through the aperture 62 of second baffle 24 for the adjacent effect. Weld 114 wraps around the junction of lower accumulator 106 with first baffle 14 in order to produce a vapor-tight joint so that fluids may not pass freely between the lower accumulator 106 and chamber 10 of the same effect.

When the condensate is being condensed in a large chamber such as chamber 10, turbulence will tend to keep non-condensibles mixed with the evaporate 66. If sufficient suction is applied to blowdown tube 69 and condensate tube 82 then a portion of the evaporate 66 will be removed from chamber 10 through the tubes 69 and 82 and this can of itself be sufficient to keep the concentration of non-condensibles under control. If a seperate exhaust port is desired to remove the non-condensible gasses, the art to implement this is well understood and thus is not illustrated.

It is also known in the art to use a tube sheet, water box, and nozzles or wicks at the tops of the heat exchanger tubes instead of distribution plugs as we have shown.

Figure 3:
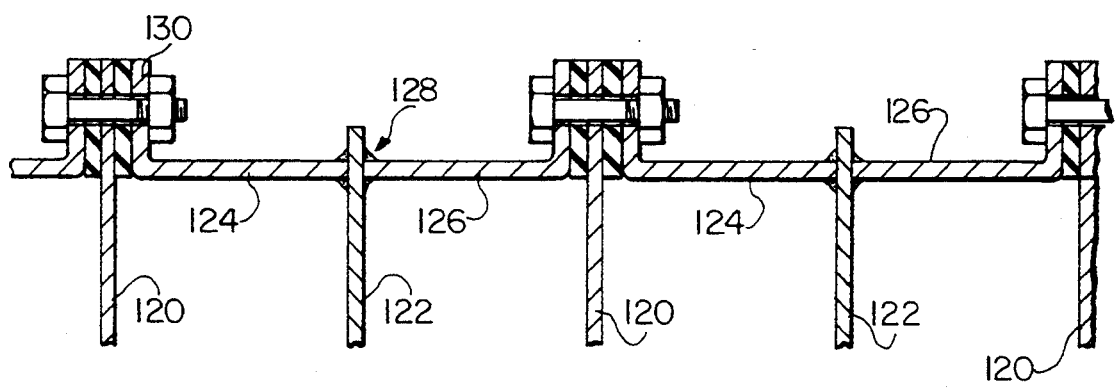
FIG. 3 is a diagram of a sectional view showing an alternate structure of a portion of FIG. 1.

In FIG. 3 free-standing baffles 120 are alternated with welded baffles 122. The free-standing baffles 120 are indentical in construction to first baffles 14, the welded baffles are similar to first baffles 14 except they are fastened to left upper walls 124 and right upper walls 126 by welds 128. Left upper walls 124 are similar in construction to upper wall 16, with a flange 130 corresponding to second flange 54. However, there is no flange or gasket on the right side of left upper wall 124 because welds 128 provide adequate fastening to welded baffles 122. Likewise right upper walls 126 are similar in construction to upper wall 16 except the second flange 54 of upper wall 16 is replaced by welds 128.

Figure 4:
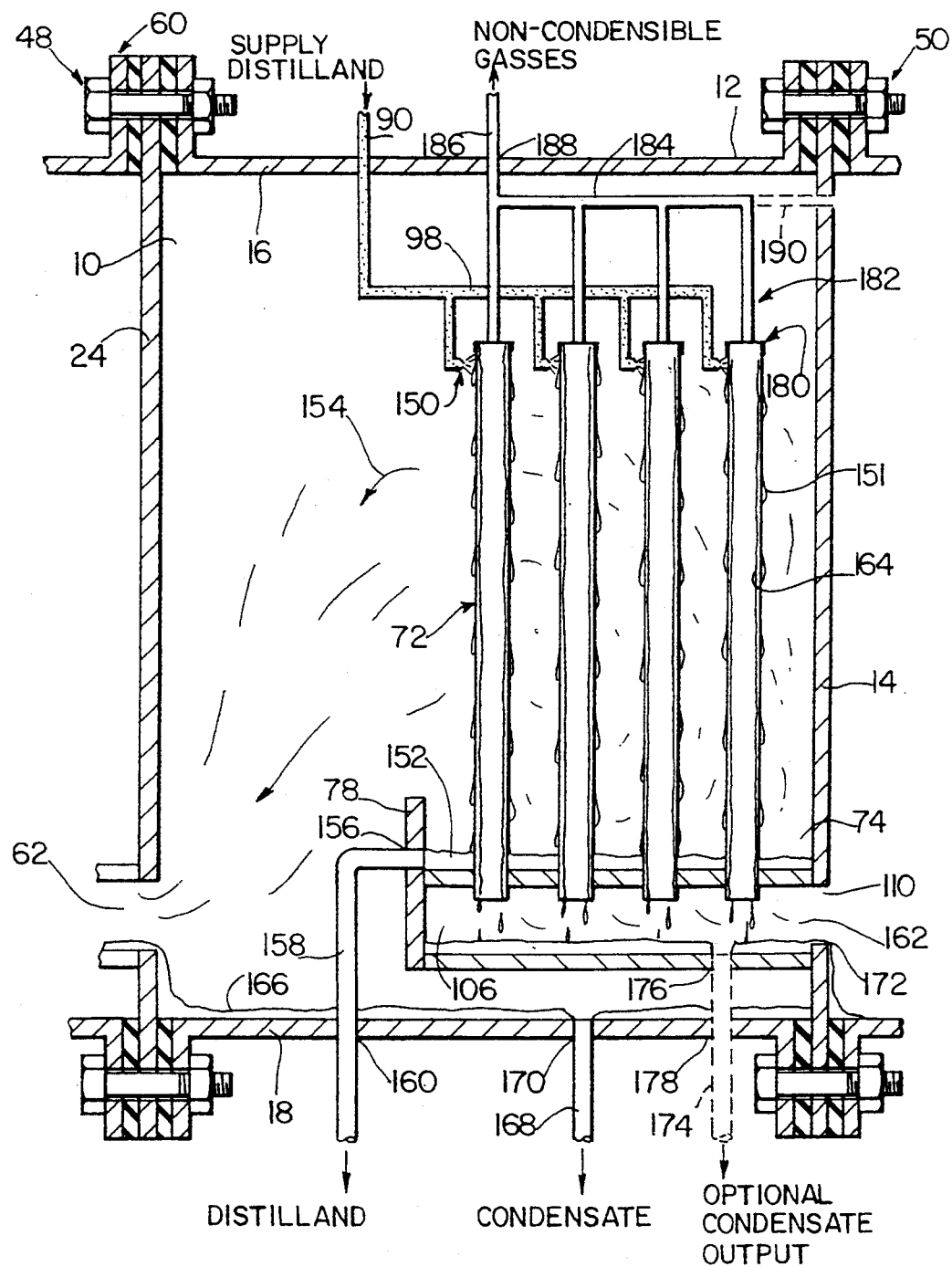
FIG. 4 is a diagram of a longitudinal sectional view of a second embodiment of the invention.

In FIG. 4 we show a second embodiment of the invention, one in which the distilland flows on the outside of the heat exchanger tubes 72 and the condensate flows on the inside. This embodiment becomes the preferred embodiment if plastic heat exchanger tubes are used since the pressure is greater on the condensing surface of a heat exchanger than the evaporating surface and it is simpler to maintain the shape of the tubes if the inside pressure is greater than the outside pressure.

In FIG. 4 all of the components are the same as in FIG. 2 except as follows.

Distribution manifold 98 distributes supply distilland 90 to nozzles 150 for spraying on the outsides of heat exchanger tubes 72 as distilland 151. After distilland 151 has flowed down the tubes 72, it is accumulated in upper accumulator 74 as blowdown distilland 152. Evaporate 154 given off by distilland 151 flows within chamber 10 until it reaches and flows through aperture 62 in second baffle 24. Blowdown distilland 152 is emptied from upper accumulator 74 through accumulator blowdown port 156 in side 78, through blowdown tube 158, and out blowdown port 160 in lower wall 18.

Incoming evaporate 162 enters aperture 110 of first baffle 14, flows through lower accumulator 106 and into heat exchanger tubes 72, whereon it condenses as condensate 164 which then flows down the tubes 72 into lower accumulator 106.

Condensate 164 flows out of lower accumulator 106 through aperture 110 of first baffle 14.

Condensate 166 flows into chamber 10 through aperture 62 in second baffle 24, collects on the floor of chamber 10, and is then removed by a condensate removal tube 168 through a condensate removal port 170 located in lower wall 18.

The following optional configuration may provide for a higher quality of condensate, as the product condensate will not be combined with condensate forming on the walls of chamber 10. Lip 172 holds condensate 164 within lower accumulator 106 until removal by product condensate removal tube 174 from a plate port 176 in plate 108 and out of the module 12 through product condensate removal port 178 in lower wall 18.

When an evaporate to be condensed enters one end of a long tube, non-condensible gasses will tend to concentrate at the far end of the tube and will not mix as readily as they will in a large chamber when condensation takes place on the outside of the tube. Thus, a means must be provided at the ends of the tubes for non-condensible gas removal.

Caps 180 with nipples 182 are inserted over the top ends of heat exchanger tubes 72 and made vapor-tight. Exhaust manifold 184 extends to and connects with each of the nipples 182 such that non-condensible gasses may flow out of the tubes 72 into exhaust manifold 184. Non-condensibles exhaust tube 186 connects to exhaust manifold 184 and extends through non-condensible gas port 188 such that non-condensible gasses may flow from exhaust manifold 184 to the outside of the chamber 10. It is also known in the art to exhaust non-condensible gasses to a lower pressure effect, such as through an optional tube 190 through optional port 192 in first baffle 14.

Figure 5:
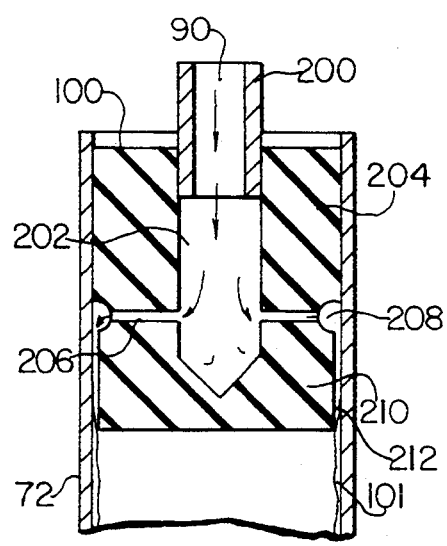
FIG. 5 is a longitudinal sectional diagram of an expanded view of a portion of the first embodiment.

In FIG. 5 a distribution plug 100 is shown inserted into the top end of a heat exchanger tube 72. Distilland 90 enters a plug nipple 200 which is inserted into central channel 202 located within an upper plug body 204 and proceeds to flow into central channel 202. Upper plug body 204 has a large enough diameter to provide a vapor-tight seal with a heat exchanger tube 72 when inserted therein. Two radial channels 206 extend from central channel 202 to a ring channel 208 and carry distilland 90 from central channel 202 into ring channel 208. Below ring channel 208 plug 100 continues as a lower plug body 210 which has a diameter less than that of heat exchanger tube 72; a gap 212 is formed between the outer surface of lower plug body 210 and the inner surface of heat exchanger tube 72. Gap 212 must be large enough to allow distilland 90 to flow out of ring channel 208, and onto heat exchanger tube 72, ultimately flowing past lower plug body 210 and down heat exchanger tube 72 as a film 101. Gap 212 must be small enough to insure that distilland 90 spreads out evenly around the surface of heat exchanger tube 72.

Whereas certain forms of the invention have been shown and described it should be understood that this description should be taken in an illustrative or diagrammatic sense only. There are many variations and modifications which will be apparent to those skilled in the art which will not depart from the scope and spirit of the invention. We, therefore, do not wish to be limited to the precise details of construction or operation set forth, but desire to avail ourselves of such variations and modifications as come within the scope of the appended claims.

I claim:

1. A multiple-effect still comprising a plurality of substantially identical modules concatenated in a horizontal array, each of said modules producing a separate effect, wherein each of said modules comprises:
   a vapor-tight chamber comprising:
      a containment box having upper, lower, first side, and second side walls, and opposed, open first and second ends, said containment box having a length and a width defined by said upper, lower, first side, and second side walls, said lower side wall including a port for removing fluids collected at said lower side wall;
      a vertical first baffle extending the length and width of said containment box and closing said first end, said first baffle having an aperture therein;
      a first vapor-tight seal interposed between said first baffle and said upper, lower, first side, and second side walls;
      a vertical second baffle extending the length and width of said containment box and closing said second end, said second baffle having an inlet aperture therein for admitting blowdown distilland and evaporate into said containment box;
      a second vapor-tight seal interposed between said second baffle and said upper, lower, first side, and second side walls;
   a plurality of vertically-oriented heat exchanger tubes disposed within said chamber above said aperture in said first baffle, said tubes having top ends and bottom ends, said top ends of said tubes being sealed against communication with the interior of said containment box;
   a horizontally-oriented tube sheet disposed within said chamber, said bottom ends of said tubes being inserted into said tube sheet;
   upper accumulator means for accumulating condensate which has flowed down the exterior of said tubes, said upper accumulator means being defined in part by the upper surface of said tube sheet and the inner surface of said first baffle;
   lower accumulator means for accumulating blowdown distilland and evaporate which have flowed down the interior of said tubes, said lower accumulator means being defined in part by the lower surface of said tube sheet and the inner surface of said first baffle, said lower accumulator means having an interior sealed against fluid communication with the interior of said containment box and an outlet defined by said aperture in said first baffle, said inlet aperture in said second baffle being in alignment with and similar in size to said outlet;
   condensate removal means for draining fluid from said upper accumulator means and transporting it out of said vapor-tight chamber; and
   distribution means for distributing a film of distilland to the inside of said tubes at said top ends; and
   wherein said second baffle of a module comprises said first baffle of an adjacent module.

2. The multiple-effect still of claim 1, said distribution means comprising a plurality of plugs sealing said top ends of said tubes against communication with the interior of said containment box, each of said plugs comprising:
   an upper plug body having a diameter sufficient to form a vapor-tight seal when inserted into said top end of one of said tubes, said upper plug body having an upper surface and a lower end and a central channel extending axially from said upper surface to said lower end; and
   a lower plug body having a smaller diameter than said upper plug body, said lower plug body being coaxial with said upper plug body and joined to said lower end of said upper plug body to form a junction therewith, said junction having formed thereat a circumferential ring channel and at least one radial channel extending from said central channel to said ring channel.

3. A multiple-effect still comprising a plurality of substantially identical modules concatenated in a horizontal array, each of said modules producing a separate effect, wherein each of said modules comprises:
   a vapor-tight chamber comprising:
      a containment box having upper, lower, first side, and second side walls, and opposed, open first and second ends, said containment box having a length and a width defined by said upper, lower, first side, and second side walls, said lower side wall including a port for removing fluids collected at said lower side walls;
      a vertical first baffle extending the length and width of said containment box and closing said first end, said first baffle having an aperture therein;
      a first vapor-tight seal interposed between said first baffle and said upper, lower, first side, and second side walls;
      a vertical second baffle extending the length and width of said containment box and closing said second end, said second baffle having an inlet aperture therein for admitting blowdown distilland and evaporate into said containment box; and
      a second vapor-tight seal interposed between said second baffle and said upper, lower, first side, and second side walls;
   a plurality of vertically-oriented heat exchanger tubes disposed within said chamber, said tubes having top ends and bottom ends, said top ends of said tubes being sealed against communication with the interior of said containment box;
   a horizontally-oriented tube sheet disposed within said chamber above said aperture in said first baffle, said bottom ends of said tubes being inserted into said tube sheet;

upper accumulator means for accumulating distilland which has flowed down the exterior of said tubes, said upper accumulator means being defined in part by the upper surface of said tube sheet and the inner surface of said first baffle;

lower accumulator means for accumulating condensate which has flowed down the interior of said tubes, said lower accumulator means being defined in part by the lower surface of said tube sheet and the inner surface of said first baffle, said lower accumulator means having an interior sealed against fluid communication with the interior of said containment box and an outlet defined by said aperture in said first baffle, said inlet aperture in said second baffle being in alignment with and similar in size to said outlet;

distilland removal means for draining fluid from said upper accumulator means and transporting it out of said containment box;

exhaust means for exhausting non-condensible gases from said top ends of said tubes outside of said containment box; and manifold means for applying distilland to the outer surface of said tubes at said top ends; and wherein said second baffle of a module comprises said first baffle of an adjacent module.

4. The multiple-effect still of claim 3, each of said modules further comprising condensate removal means for draining fluid from said lower accumulator means and transporting it out of said containment box.

* * * * *